(12) United States Patent
Ouderkirk (10) Patent No.: US 11,699,851 B2
(45) Date of Patent: Jul. 11, 2023

(54) BEAM SPOILING

(71) Applicant: Raytheon Company, Waltham, MA (US)

(72) Inventor: Gregg D. Ouderkirk, Fort Ann, NY (US)

(73) Assignee: Raytheon Company, Waltham, MA (US)

( * ) Notice: Subject to any disclaimer, the term of this patent is extended or adjusted under 35 U.S.C. 154(b) by 105 days.

(21) Appl. No.: 16/686,573

(22) Filed: Nov. 18, 2019

(65) Prior Publication Data
US 2021/0151880 A1    May 20, 2021

(51) Int. Cl.
*H01Q 3/34* (2006.01)
*G01S 7/03* (2006.01)
*G01S 13/02* (2006.01)

(52) U.S. Cl.
CPC .............. *H01Q 3/34* (2013.01); *G01S 7/032* (2013.01); *G01S 2013/0263* (2013.01)

(58) Field of Classification Search
None
See application file for complete search history.

(56) References Cited

U.S. PATENT DOCUMENTS

| | | | |
|---|---|---|---|
| 3,355,738 A * | 11/1967 | Algeo | H01Q 25/02 343/840 |
| 4,532,519 A | 7/1985 | Rudish et al. | |
| 5,258,767 A * | 11/1993 | Nomoto | H01Q 25/007 343/781 R |
| 8,604,976 B1 | 12/2013 | Chang et al. | |
| 9,620,856 B2 | 4/2017 | Jin | |
| 2005/0259000 A1* | 11/2005 | Pennington | G01S 7/282 342/202 |
| 2010/1370849 | 1/2010 | Paynter | |
| 2013/0057432 A1* | 3/2013 | Rajagopal | H01Q 25/002 342/368 |
| 2020/0142046 A1 | 5/2020 | Ouderkirk | |

FOREIGN PATENT DOCUMENTS

WO   WO 2019/199349 A2   10/2019

OTHER PUBLICATIONS

EP0056984 translation (Year: 1982).*
International Search Report and Written Opinion dated May 3, 2021 for International Application No. PCT/US2020/048057; 15 Pages.
Brown et al., "Extreme Beam Broadening Using Phase Only Pattern Synthesis;" Fourth IEEE Workshop on Sensor Array and Multi-channel Processing; Jul. 12-14, 2006; 4 Pages.

(Continued)

*Primary Examiner* — Whitney Moore
(74) *Attorney, Agent, or Firm* — Daly Crowley Mofford & Durkee, LLP (57) ABSTRACT

Methods and apparatus for a phase array radar to generate fan beams with curve of constant phase with spoiling in u and/or v space. In embodiments, beam pattern weighting is phase-only and applicable to transmit and receive. In embodiments, the beam pattern accounts for the apparent curvature of the horizon in uv space.

21 Claims, 10 Drawing Sheets

(56) References Cited

OTHER PUBLICATIONS

Coleman et al., "Phase-Only Tapers for Regular Planar Arrays, a Heuristic Nonlinear-FM Approach;" 2010 IEEE International Symposium on Phased Array Systems & Technology; Oct. 12-15, 2010; 8 Pages.

Kerce et al., "Phase-Only Transmit Beam Broadening for Improved Radar Search Performance;" 2007 IEEE Radar Conference; Apr. 17-20, 2007; 6 Pages.

Olin, "Flat-Top Sector Beams Using Only Array Element Phase Weighting: A Metaheuristic Optimization Approach;" Naval Research Laboratory, NRL/FR/5303-12-10,227; Oct. 10, 2012; 53 Pages.

PCT International Preliminary Report on Patentability dated June, 2, 2022 for International Application No. PCT/US2020/048057; 9 Pages.

\* cited by examiner

BEAM SPOILING

BACKGROUND

As is known in the art, a phased array antenna includes a plurality of antenna elements spaced apart from each other by known distances coupled through a plurality of phase shifter circuits to either or both of a transmitter or receiver. In some cases, the phase shifter circuits are considered part of the transmitter and/or receiver.

As is also known, phased array antenna systems are adapted to produce a beam of radio frequency energy (RF) and direct such beam along a selected direction by controlling the phase (via the phase shifter circuitry) of the RF energy passing between the transmitter or receiver and the array of antenna elements. In an electronically scanned phased array, the phase of the phase shifter circuits (and thus the beam direction) is set by sending a control signal or word to each of the phase shifter sections. The control word is typically a digital signal representative of a desired phase shift and may comprise a desired attenuation level and other control data.

Phased array antennas are often used in both defense and commercial electronic systems. For example, Active, Electronically Scanned Arrays (AESAs) are in demand for a wide range of defense and commercial electronic systems such as radar surveillance and track, terrestrial and satellite communications, mobile telephony, navigation, identification, and electronic counter measures. Military radar systems often require both long range operation for Ballistic Missile Defense (BMD) missions (requiring fully focused, high sensitivity beam patterns) and short-range operation for volume surveillance missions (requiring spatially broadened beams to scan the surveillance volume faster). Such systems may also be used for electronic warfare (EW) and intelligence collection. Thus, the systems are often deployed on a single structure such as a ship, aircraft, missile system, missile platform, satellite, or a building.

Radar systems transmit signals in a desired pattern and receive signals reflected from one or more targets. In some cases, it is desirable to have a broad antenna pattern transmitted and/or received by an antenna, such as a phased-array antenna. In conventional systems, phase-only weighting patterns are calculated using iterative, non-realtime optimization of various antenna parameters, such as desired beamwidth, sidelobe levels, efficiency, etc.

SUMMARY

Embodiments of the invention provide methods and apparatus for a phased array antenna system that focuses transmit and/or receive antenna patterns across the horizon, for example, for enabling simultaneous horizon surveillance. In embodiments, closed-form processing is used for calculating a phase-only weighting function to focus a horizon-wide antenna pattern. In contrast to attempting to optimize some set of pattern parameters as in conventional systems, in example embodiments of the invention the phase front is calculated directly by focusing the beam directly across the desired field of view (FOV). In embodiments, adjustments can be made for scan loss so that the resultant beam has near-constant gain across the FOV. Further adjustments can be made to account for antenna tilt and roll so that the antenna pattern stays on the horizon across the FOV.

While example embodiments are shown and described in conjunction with broad azimuthal fan beams, it is understood embodiments of the invention are applicable to phased-array antenna systems in general in which broad beams of any orientation are desirable. Example antenna patterns can be provided, for example for ninety to one-hundred and twenty degrees in one dimension, e.g., azimuth, elevation, and/or rotated fan beams. In embodiments, example antenna patterns follow a desired real space shape in contrast to prior art systems that provide patterns that are flat in UV-space and curved in real space.

It will be appreciated that closed-form processing of phase-only weighting function is suitable for real-time calculations for mobile platform applications, such as aircraft, ships and other vehicles, as well as stationary systems, passive horizon scan radars, independent illumination applications, e.g., forward-based transmitter, etc.), communication systems, e.g., NCR/ROCR applications, AAW search radars, synthetic aperture imaging radars, weather radar systems, navigation radar systems, and the like.

In one aspect, a method comprises: generating a beam from phased array radar face having a curve of constant phase. The method can further include one or more of the following features: the beam comprises a fan beam, the beam is spoiled in u space, the beam is spoiled in v space, the beam has a fixed amplitude, the beam is spoiled in u space based on array element spacing in a column, wavelength, number of elements in columns of the phased array radar face, and the array field of view, the beam is modified for scan loss, the beam is spoiled in v space based on array row element-to-element spacing, wavelength, and number of row elements, controlling the beam in real-time without iterative processing, and/or the beam has a pattern that is flat in real space and curved in uv space that follows the horizon.

In another aspect, a phased array radar system comprises: a beamformer and a beam spoiler module configured to: generate a beam from a face of the phased array radar having a curve of constant phase. The system can further include one or more of the following features: the beam comprises a fan beam, the beam is spoiled in u space, the beam is spoiled in v space, the beam has a fixed amplitude, the beam is spoiled in u space based on array element spacing in a column, wavelength, number of elements in columns of the phased array radar face, and field of view of the array, the beam is spoiled in v space based on array row element-to-element spacing, wavelength, and number of row elements, controlling the beam in real-time without iterative processing, and/or the beam has a pattern that is flat in real space and curved in uv space that follows the horizon.

In another aspect, an article comprises: a non-transitory computer-readable medium having stored instructions that cause a phase array radar to generate a beam from a face of the phased array radar having a curve of constant phase. The article can further include instructions for one or more of the following features: the beam comprises a fan beam, the beam is spoiled in u space, the beam is spoiled in v space, the beam has a fixed amplitude, the beam is spoiled in u space based on array element spacing in a column, wavelength, number of elements in columns of the phased array radar face, and the array field of view, the beam is modified for scan loss, the beam is spoiled in v space based on array row element-to-element spacing, wavelength, and number of row elements, controlling the beam in real-time without iterative processing, and/or the beam has a pattern that is flat in real space and curved in uv space that follows the horizon.

BRIEF DESCRIPTION OF THE DRAWINGS

The foregoing features of this invention, as well as the invention itself, may be more fully understood from the following description of the drawings in which.

DETAILED DESCRIPTION

Figure 1:
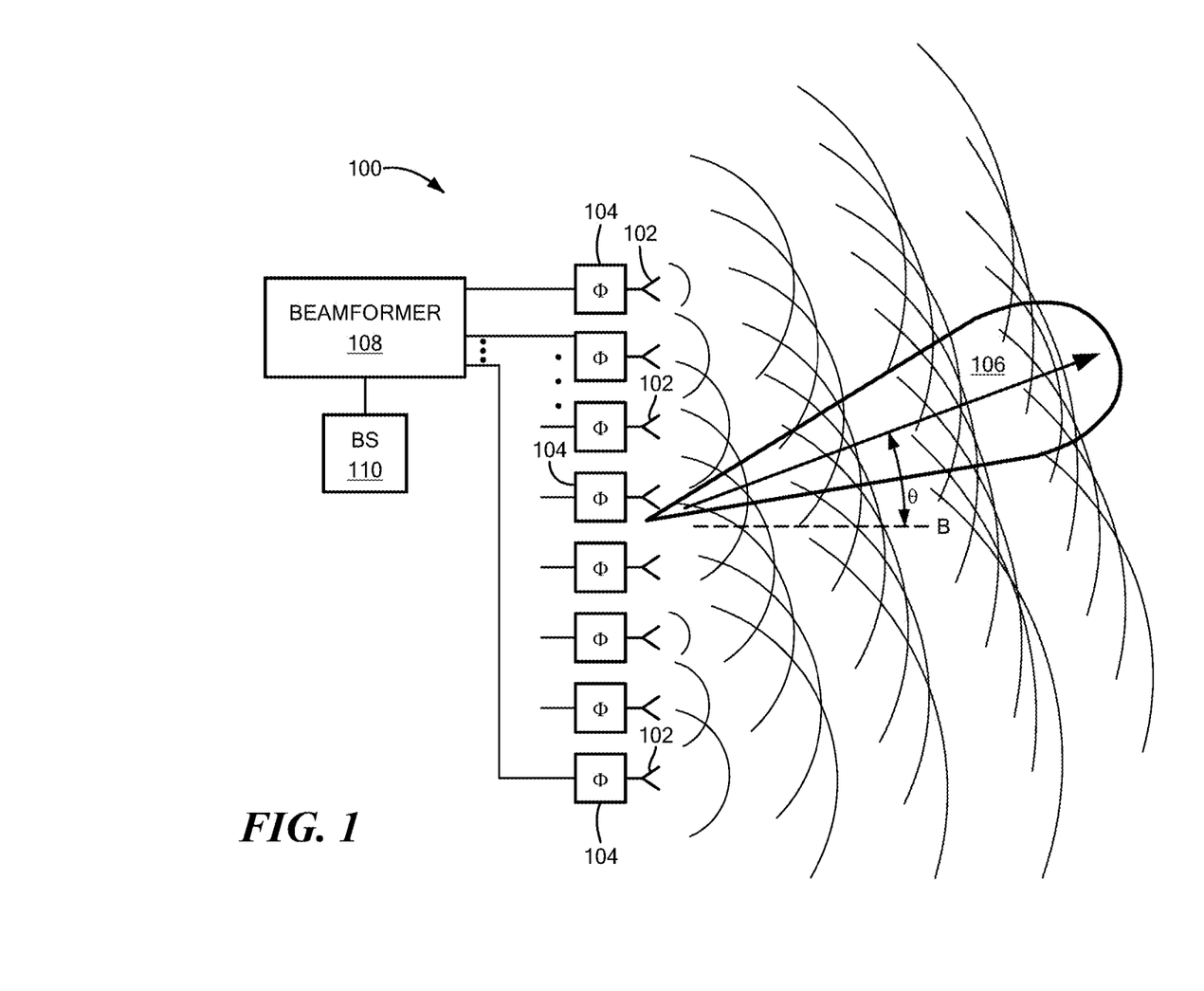
FIG. 1 is a schematic representation of an example phased array system for generating spoiled beams from an array face with curve of constant phase.

FIG. 1 shows an example phased-array radar system 100 having beam spoiling in accordance with example embodiments of the invention. The phased-array radar system 100 includes a series of receive or transmit/receive elements 102. In embodiments, the system 100 can energize the array elements 102 controlled in phase and amplitude by phase shifters 104 to create one or more beams 106. A beamformer 108 can control signals to the phase shifters 104. The illustrated beam 106 has an angle theta relative to broadside B of the antenna. The beam(s) 106 are formed as the signals from the antenna elements combine to create a plane wave having a given direction. The direction of the beam 106 is selected by controlling the phase. A beam spoiler module 110 coupled to the beamformer 108 can spoil transmit/receive beams in a desired way, as described more fully below.

Figure 2:
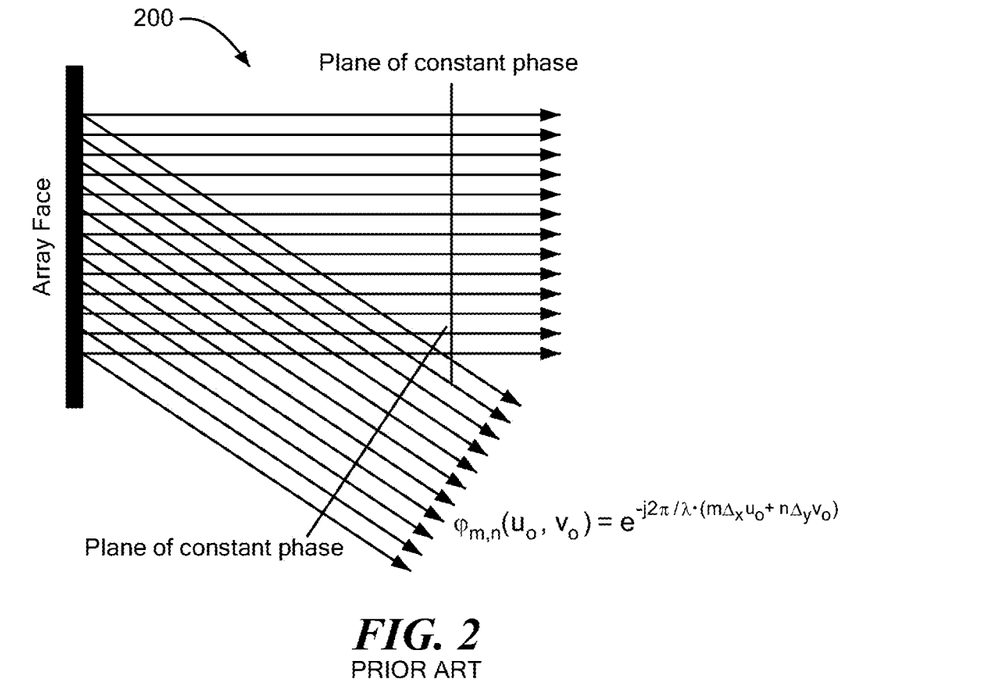
FIG. 2 is a schematic representation of a conventional phased array radar generating a beam with a plane of constant phase.

FIG. 2 shows a phased-array radar 200 having conventional beam steering with a linear phase front with a plane of constant phase. One or more beams can be steered by controlling the phase of the signals from array elements.

Figure 3:
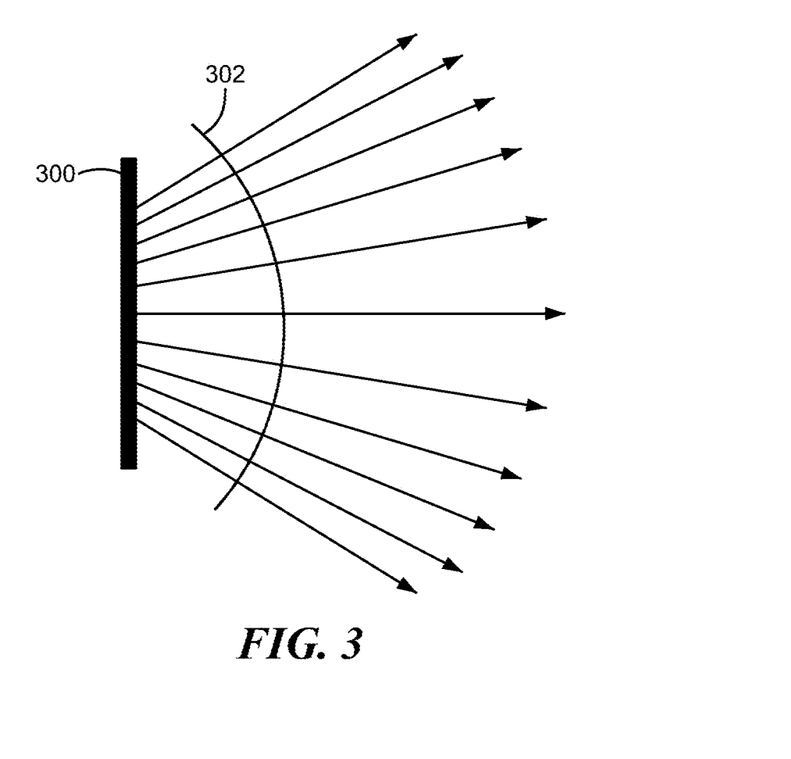
FIG. 3 is a schematic representation of a phased array radar face generating spoiled beams from an array face with curve of constant phase.

FIG. 3 shows beam steering across a face 100 of an array with a curve of constant phase 302 in accordance with embodiments of the invention. In u-v space, in embodiments the phase-only spoiling function can be defined as $\phi(m,n) = \phi_U(n) + \phi_{steer}(n,m)$, where $\phi_U(n)$ defines the u spoiling function, $\phi_V(m)$ defines the v spoiling function, and $\phi_{steer}(n,m)$ refers to the uv steering function, as described more fully below.

Figure 4:
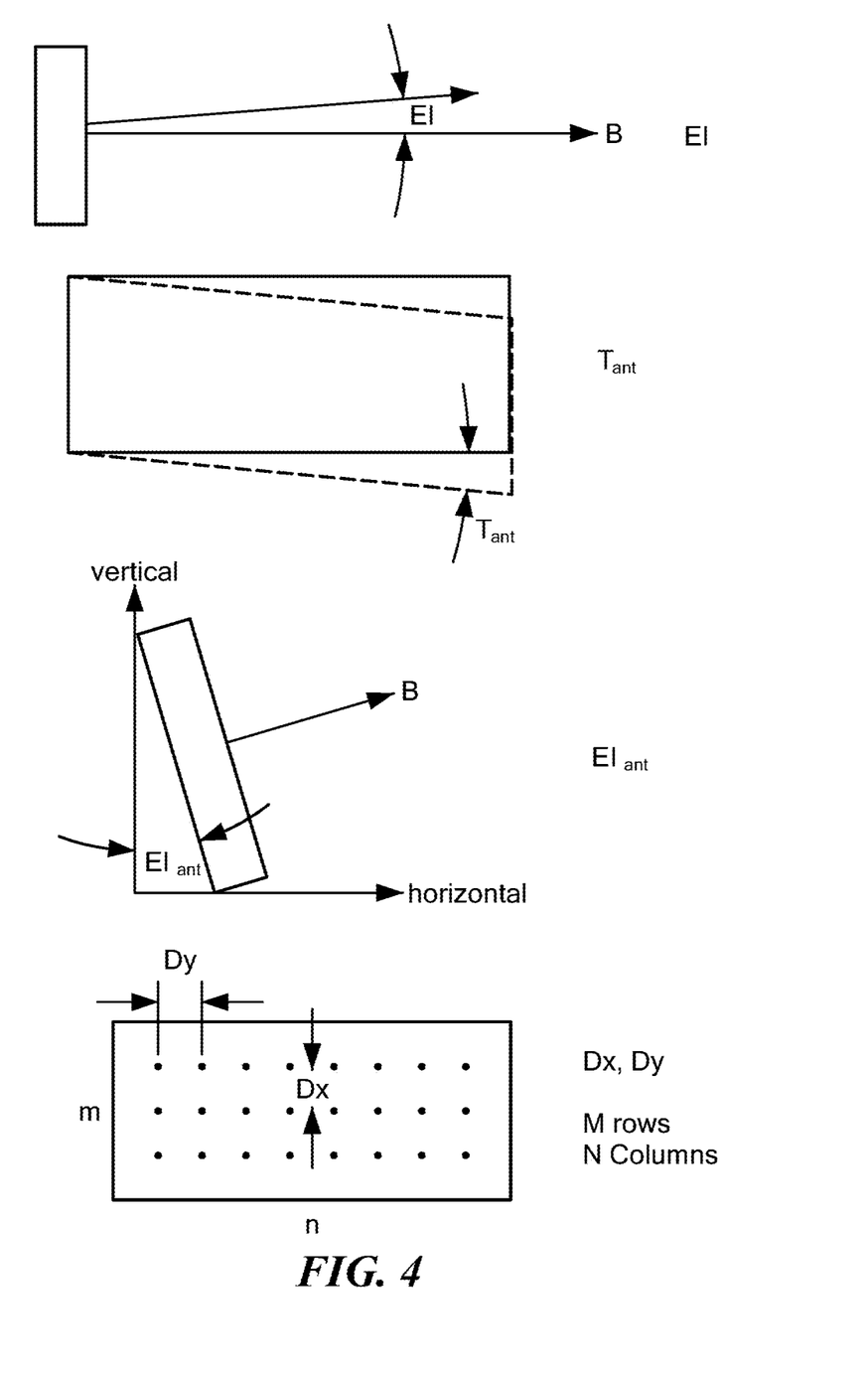
FIG. 4 illustrates radar parameters than can be used to generate u and v beam spoiling.
Figure 5:
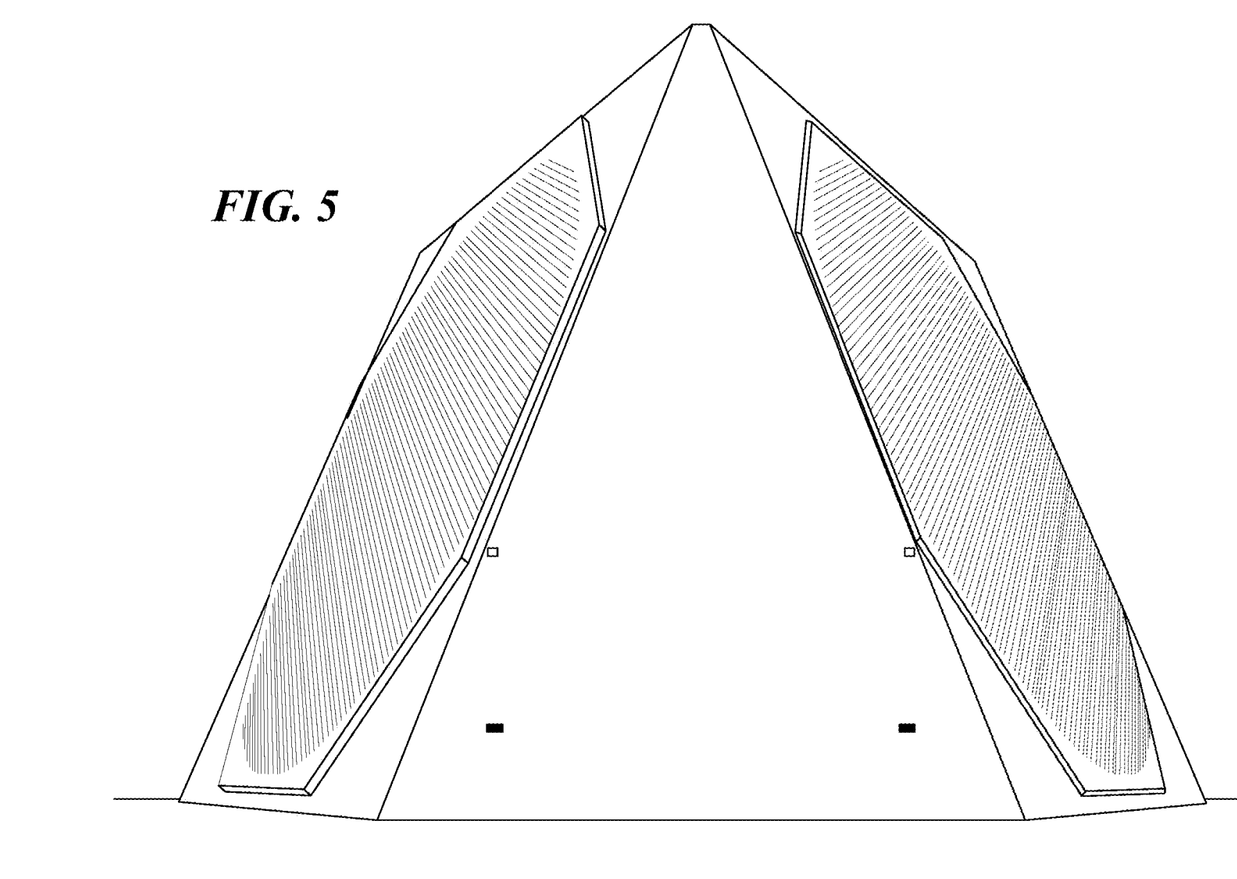
FIG. 5 is an example three-face phased array radar that may be suitable for transmitting and/or receiving spoiled beams from an array face with curve of constant phase.

The below defines terms that may be used herein, some of which are shown in FIG. 4, where B indicates broadside. FIG. 5 shows an example three-face phase array radar that may be suitable for example embodiments of the invention:

(m,n)—example embodiment of phase spoiling function $\phi_U(n)$—U-only term of the spoiling function $\phi_V(m)$—V-only term of the spoiling function (not required if no V spoiling)

$\phi_{steer}(m,n)$—UV steering term of the main beam m,M—array element row index, M rows n,N—array element column index, N columns $\varphi(u_0, v_0)$—unspoiled phase function for steering to $u_0, v_0$ $\lambda$—wavelength $\Delta_x, \Delta_y$—row, column element spacing $U_{max}$—desired U extent of the spoiled beam $\theta_{fov}$—design-to-Azimuth field of view (FOV)

w(n)—phase weighting function to compensate for scan loss and antenna effects k—exponent for the above weighting function, a tuning value (typically 0.1-0.25)

$U_{steer}(n)$—column steering angle, a smooth function across the FOV $V_{steer}(n)$—steering angle for each column to the desired elevation angle (El)

$V_{max}$—desired V extent of the spoiled beam (if V spoiling used)

Figure 6:
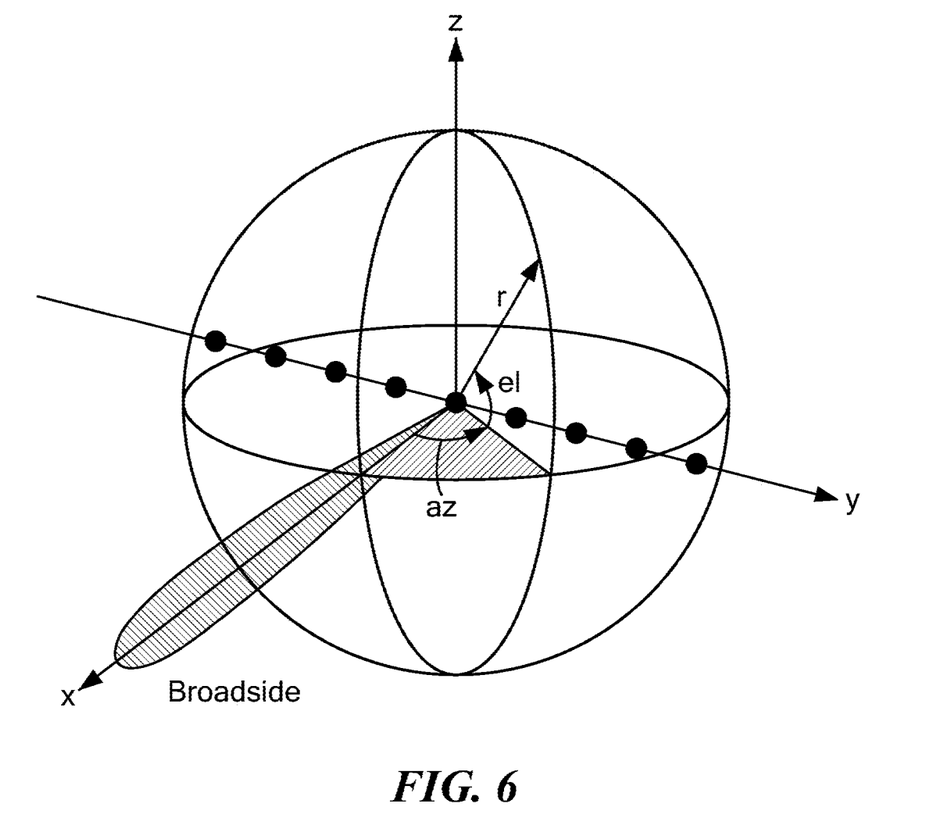
FIG. 6 is a schematic representation of azimuth and elevation angles.

El—desired elevation angle of the spoiled beam $El_{ant}$—antenna elevation angle $T_{ant}$—antenna tilt angle FIG. 6 shows an example polar coordinate representation of vector r defining an elevation angle el and an azimuth angle az. In uv space, u=cos(el)sin(az) and v=sin(el). Example embodiments of the invention are shown and described in uv space. It is understood that other embodiments may use other suitable representations.

Figure 7A:
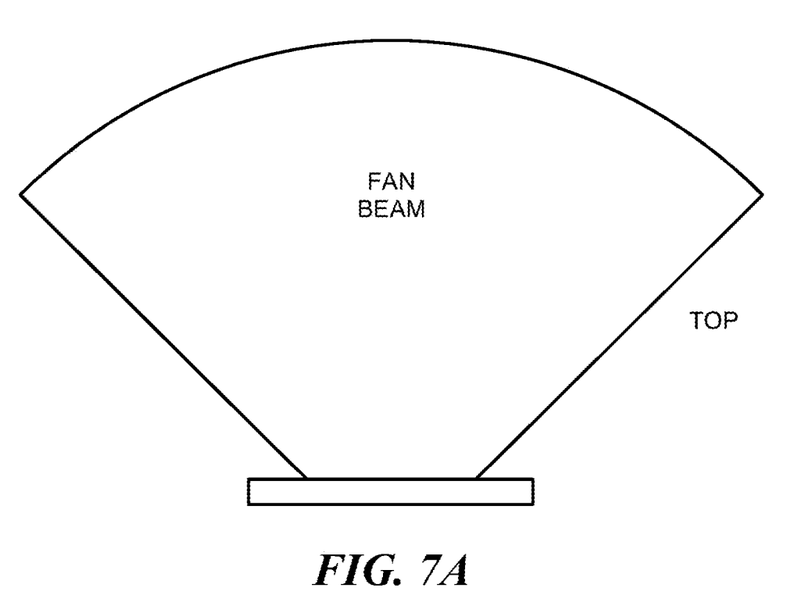
FIG. 7A shows a top view of a horizontal fan beam and FIG. 7B shows a side view of the horizontal fan beam of FIG. 7A.
Figure 7B:
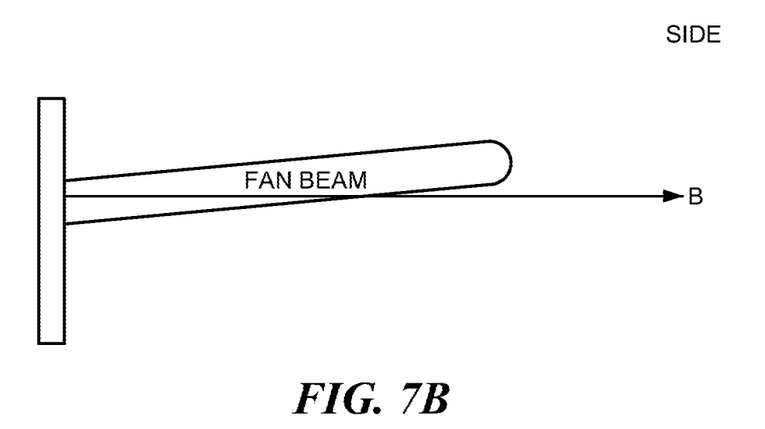

FIG. 7A shows a top view and FIG. 7B shows a side view of an example fan beam that can be generated in accordance with example embodiments, as further described below. In general, a fan beam refers to a beam having one dimension larger than another. Embodiments are shown having a horizontal fan beam to scan the horizon. As can be seen in FIG. 7B, the fan beam has an angle from broadside B of the array face. It is understood that a fan beam can have any desired orientation including horizontal, vertical and any orientation in between.

In embodiments, a beam is spoiled to have desired characteristics. Spoiling refers to techniques and systems for "spoiling" (or modifying from optimal configuration) the receive or transmit beam of a phased array antenna in order to affect a shape change in the beam by adjusting the phase of the array elements. In embodiments, only the phase is adjusted for each element in a way that de-focuses or spoils the transmit beam. This spoiling, in turn, enables the transmission of a broader, tailored beam that provides illumination over an area that would otherwise require multiple scans from the (normally) highly-focused, narrow transmit beams. In example embodiments, a closed-form solution is provided that may sacrifice some antenna pattern efficiency in exchange for greatly reduced computational complexity over prior art, optimal search techniques.

Digital beamforming (DBF) techniques may be used at the element (or sub-array/sub-aperture of elements) level to provide the receive beams for radar applications employing transmit beam spoiling. In such applications, the receive beam (or beams) are synchronized in both time and space in order to receive a return signal from the target(s). Digital beamforming in the receive beams may then be used to match the number and composite coverage of the receive beams to the spoiled pattern.

Embodiments provide beam pattern weighting for focusing phased array antenna patterns across the entire horizon, for example, to enable simultaneous horizon surveillance. While conventional systems may sequentially form beams across a given volume, embodiments of a phased array system form a beam, such as a fan beam, across the horizon. In example, embodiments, the weighting pattern is phase-only with applicability to receive and transmit where the array element output amplitude is fixed. In embodiments, the weighting pattern accounts for the apparent curvature of the horizon in UV-space and supports independent U and V weighting. Spoiling and/or sidelobe weighting in V can be provided. In embodiments, beam spoiling does not require an iterative process so that real-time re-calculation can be performed to account for platform motion.

In embodiments, a spoiling function is defined as:

$$\phi(m,n) = \phi_U(n) + \phi_V(m) + \phi_{steer}(n,m)$$

where the u spoiling function is defined as $\phi_U(n)$, the v spoiling function is defined as $\phi_V(m)$, and the uv steering function is defined as $\phi_{steer}(n,m)$. As defined above, n refers to an array element column index and m refers to a row index.

The u spoiling function can defined as:

$$\phi_U(n) = \frac{2\pi d_u}{\lambda} U_{max} \frac{n(n-N+1)}{N-2}, n \in [0, N-1]$$

where $U_{max} = \sin(\theta_{FOV}) - 2\lambda/\Delta_x N$

In embodiments, the beam can be modified for scan loss and the like using weights w:

$$\phi_U(n) = \frac{2\pi\Delta_x}{\lambda} U_{max} \frac{n(n-N+1)}{N-2} \frac{w(n)}{\min[w(n)]},$$

where $$w(n) = (1 - U_{steer}^2(n) - V_{steer}^2(n))^k$$

In embodiments, as noted above, k can be an exponent that provides a tuning value, which may be between about 0.1 and 0.25.

In embodiments, can be defined as:

$$U_{steer} = U_{max} \frac{2n+1-N}{N-1}$$

Figure 8A:
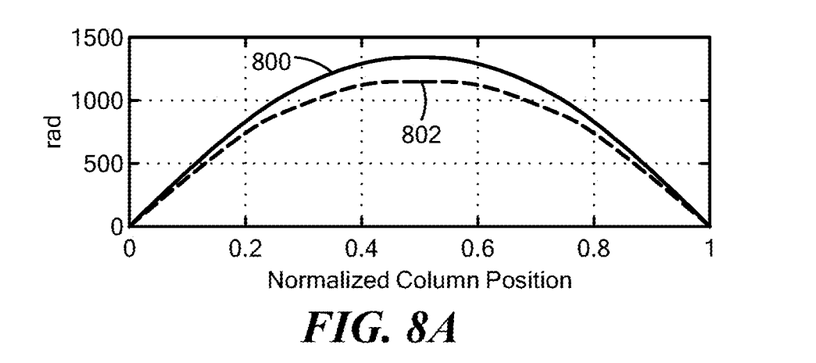
FIG. 8A is a plot of spoiled and unspoiled beams for normalized array element column position versus radians.
Figure 8B:
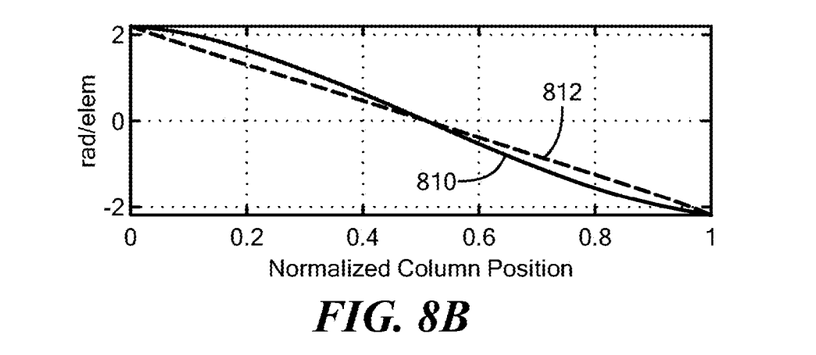
FIG. 8B is a plot of spoiled and unspoiled beams for normalized array element column position versus radians/element.
Figure 8C:
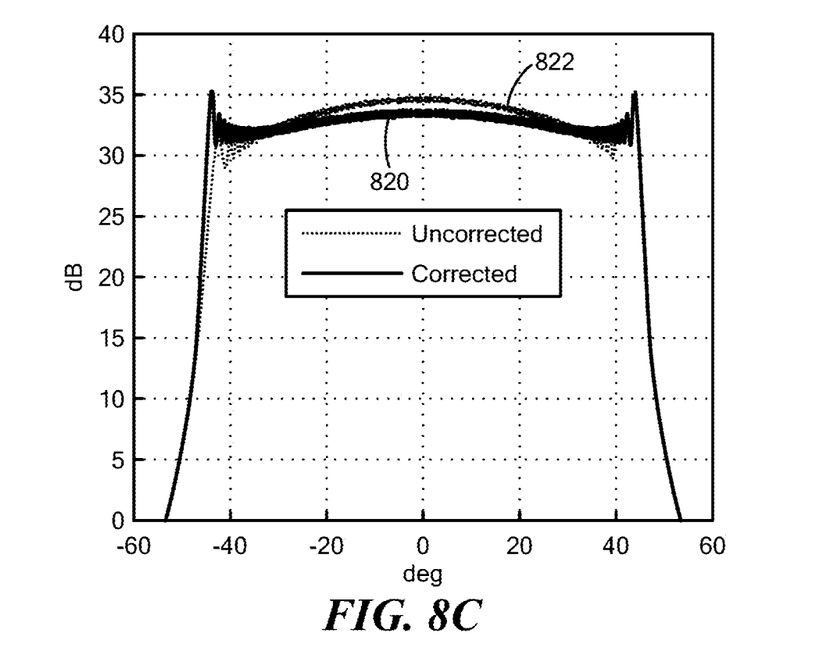
FIG. 8C is a plot of spoiled and unspoiled beams in degrees versus dB.

FIG. 8A is a graph of normalized column (n) position versus radians for a spoiled beam 800 and an unspoiled beam 802 for u spoiling. FIG. 8B shows normalized column position versus radians/element spoiled beam 810 and an unspoiled beam 812. FIG. 8C shows degrees versus dB for a spoiled beam 820 and an unspoiled beam 822. It is understood that the spoiled beam 820 is flatter than the unspoiled beam and that flatter is 'better' since the gain is more uniform over the curve of constant phase.

The v spoiling function can be defined as:

$$\phi_V(m) = \frac{\pi\Delta_y}{\lambda} V_{max} \frac{m(m-M+1)}{M-2},$$

m∈[0, M−1]

In embodiments, modification for scan loss, overlap beamformer effects, and the like are not performed since the total beamwidth in v may be relatively small. In some embodiments, u or v spoiling is not performed.

The uv steering function can be defined as:

$$\phi_{steer}(m,n) = m\frac{2\pi\Delta_y}{\lambda} V_{steer}(n), m \in [0, M-1]$$

$$V_{steer}(n) \approx -\sqrt{1 - U_{steer}(n)^2} \; \sin El_{ant}$$

If the antenna tilt angle $T_{ant}=0$, and the steer elevation El=0, then $$V_{steer}(n) = -\sqrt{1-U_{steer}(n)^2} \sin El_{ant}$$

If the antenna tilt angle $T_{ant}=0$, then $$V_{steer}(n) = -\cos El \sin El_{ant}\sqrt{1-U_{steer}(n)^2\sec^2 El} + \cos El_{ant}$$

Figure 9A:
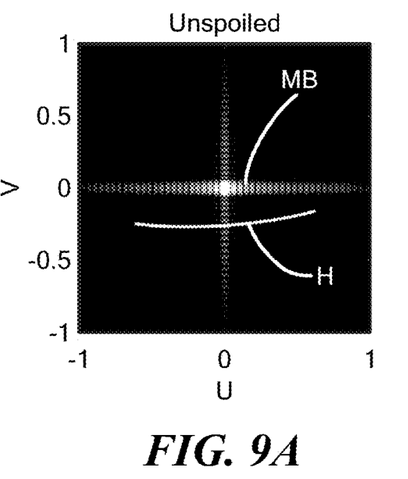
FIG. 9A shows a plot of a main beam unspoiled in uv.
Figure 9B:
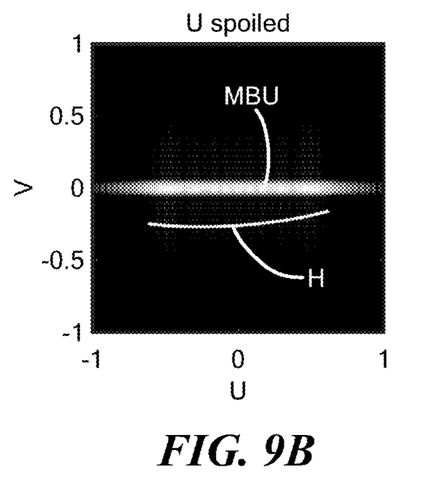
FIG. 9B shows a plot of a main beam spoiled in u.
Figure 9C:
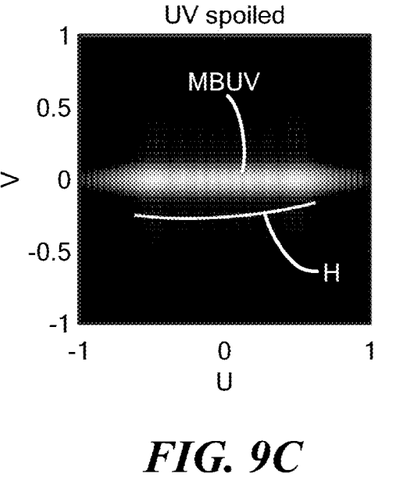
FIG. 9C shows a plot of a main beam spoiled in u and v.
Figure 9D:
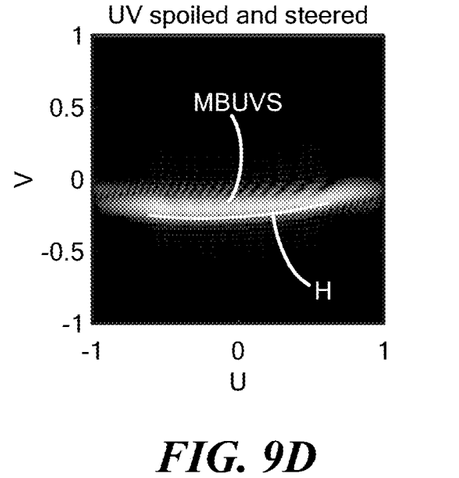
FIG. 9D shows a steered main beam spoiled in u and v.

With full enumeration, of $V_{steer}$ as a function of $U_{steer}$:

$$V_{steer} = \frac{h_1 - h_2}{\cos^2 T_{ant} + \sin^2 El_{ant}\sin^2 T_{ant}}$$

where $h_1 = \cos El_{ant} \cos T_{ant} \sin El - U_{steer} \cos^2 El_{ant} \cos T_{ant} \sin T_{ant}$ $h_2 = \cos El \sin El_{ant}\sqrt{h_3}$ $h_3 = \cos^2 T_{ant} - \sec^2 El \cdot (U_{steer} + \sin(El_{ant}-El)\sin T_{ant}) \cdot (U_{steer} - \sin(El_{ant}+El)\sin T_{ant})$ FIG. 9A shows a plot of a main beam MB unspoiled in uv. As can be seen, the main beam MB is centered at a uv position of (0,0). The horizon H can be seen below the main beam. FIG. 9B shows a plot of the main beam spoiled in u ($\phi_U(n)$) to generate a u-spoiled beam MBU. As can be seen, the beam is spoiled in u ($\phi_V(m)$) to provide a uniform gain over the u field of view. FIG. 9C shows a plot of the main beam spoiled in u and v ($\phi_U(n)+\phi_V(m)$) to generate a uv-spoiled beam MBUV. FIG. 9D shows a steered main beam spoiled in u and v ($\phi(m,n)=\phi_U(n)+\phi_V(m)+\phi_{steer}(n,m)$) to generate a steered UV-spoiled beam MBUVS to scan the horizon H.

In one embodiment, example parameters for a phased array include $\Delta/\lambda=0.5$, M=48, N=48, $El_{ant}=15°$, $Tilt_{ant}=-4.3°$, FOV=+/−45° with a desired beamwidth in azimuth is about 90 degrees, the beamwidth in elevation is 4 degrees above horizon, with a 30 dB Taylor weighting in elevation.

Figure 10A:
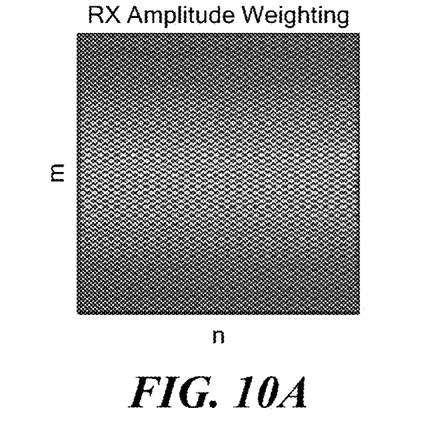
FIG. 10A shows receiver amplitude weighting for array elements in m rows and n columns.
Figure 10B:
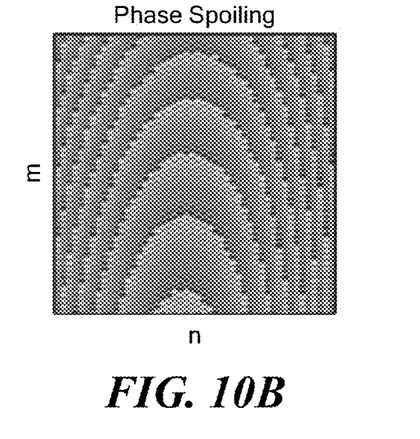
FIG. 10B shows phase spoiling for array elements in m rows and n columns.

For the example parameters above, FIG. 10A is a graphical representation of receiver amplitude weighting over m,n rows and columns corresponding to a horizontal fan beam. FIG. 10B shows the phase spoiling over m,n rows and columns.

Figure 11A:
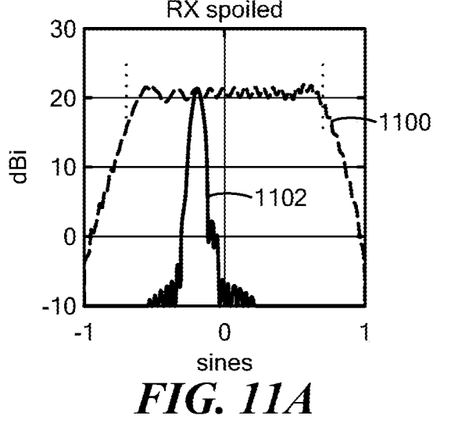
FIG. 11A shows a spoiled receive beam in u and v in sines versus dB.
Figure 11B:
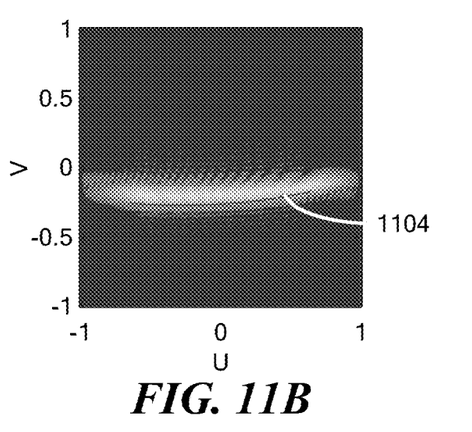
FIG. 11B shows the spoiled receive beam of FIG. 11A in u and v space.
Figure 12A:
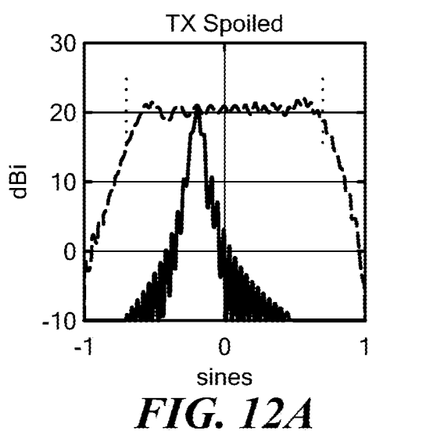
FIG. 12A shows a spoiled transmit beam in u and v in sines versus dB.
Figure 12B:
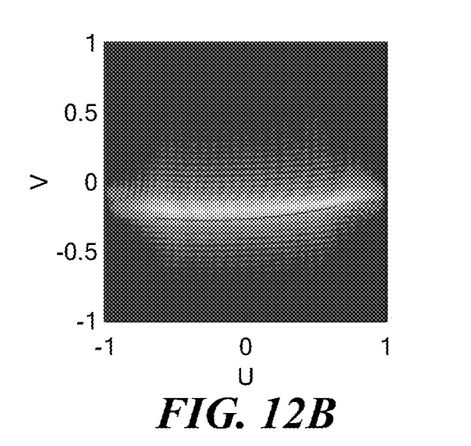
FIG. 12B shows the spoiled transmit beam of FIG. 12A in u and v space.

FIG. 11A shows a spoiled receiver beam in u 1100 and v 1102 corresponding to a horizontal fan beam. As can be seen, there is a 20 dB gain. FIG. 11B shows the fan beam in uv space including a curvature 1104 that may correspond to the horizon. It is understood that the horizon is flat in real space and curved in uv coordinates. FIG. 12A and FIG. 12B show similar representations of a spoiled transmit beam including curvature.

Figure 13:
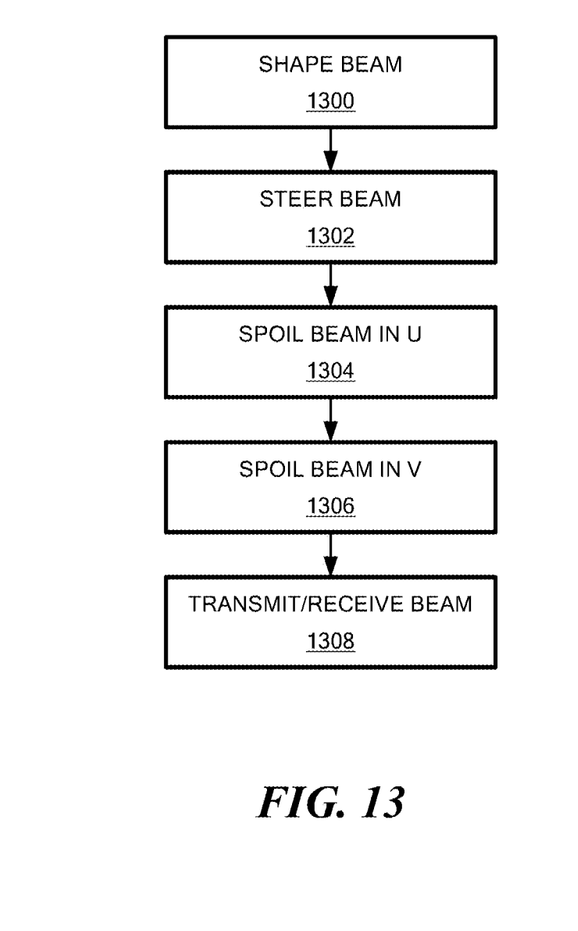
FIG. 13 shows an example sequence of steps for generating a spoiled beam having a curve of constant phase.

FIG. 13 shows an example sequence of steps for providing beam spoiling in accordance with example embodiments. In step 1300, a desired beam shape is received and in step 1302, a main beam is steered to a desired direction. For example, a fan beam can be steered to a given azimuth and elevation angle by controlling the phase of elements in a phased array radar. As described above, the beam may have a curve of constant phase. In step 1304, a spoiling function in u is selected and in optional step 1306, a spoiling function in v is selected to generate the spoiled beam. In step 1308, a transmit or receive beam having the selected shape and spoiling characteristics is transmitted or received.

Figure 14:
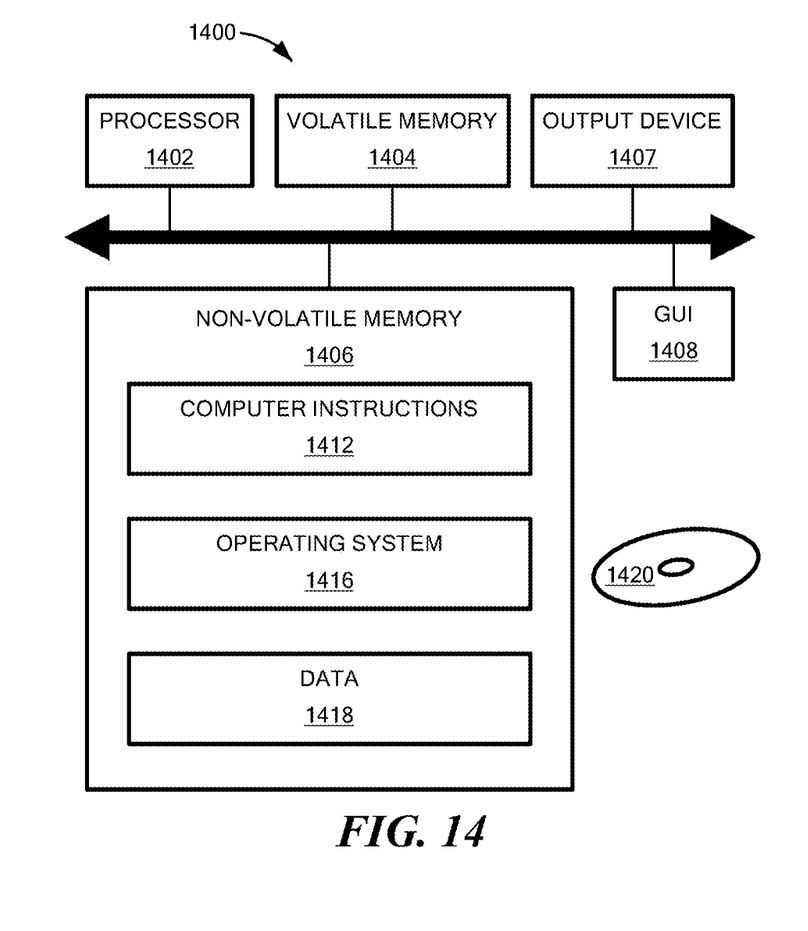
FIG. 14 is an example computer that can perform at least a portion of the processing described herein.

FIG. 14 shows an exemplary computer 1400 that can perform at least part of the processing described herein, such as the processing of FIGS. 1, 3, 7, 13 and equations contained here. For example, the computer 1400 can perform processing to generate signals for array antenna elements to shape a beam and spoil the beam in u and/or v space, as described herein. The computer 1400 includes a processor 1402, a volatile memory 1404, a non-volatile memory 1406 (e.g., hard disk), an output device 1407 and a graphical user interface (GUI) 1408 (e.g., a mouse, a keyboard, a display, for example). The non-volatile memory 1406 stores computer instructions 1412, an operating system 1416 and data 1418. In one example, the computer instructions 1412 are executed by the processor 1402 out of volatile memory 1404. In one embodiment, an article 1420 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used.

The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
generating a beam from a phased array radar face having a curve of constant phase,
wherein the beam is spoiled in u space,
wherein the beam is spoiled in v space, and
wherein the beam has a pattern that is flat in real space and curved in uv space that follows the horizon.

2. The method according to claim 1, wherein the beam comprises a fan beam.

3. The method according to claim 1, wherein the beam has a fixed amplitude is generated by array elements of the phase array radar face having fixed amplitudes.

4. The method according to claim 1, wherein the beam is spoiled in u space based on array element spacing in a column, wavelength, number of elements in columns of the phased array radar face, and the array field of view.

5. The method according to claim 1, wherein the beam is modified for scan loss.

6. The method according to claim 1, wherein the beam is spoiled in v space based on array row element-to-element spacing, wavelength, and number of row elements.

7. The method according to claim 1, wherein the beam comprises a fan beam with beam pattern weighting for simultaneous horizon surveillance.

8. The method according to claim 1, wherein a phase-only spoiling function is defined as $\phi(m, n) = \phi_U(n) + \phi_V(m) + \phi_{steer}(n, m)$, where $\phi_U(n)$ defines the u spoiling function, $\phi_V(m)$ defines the v spoiling function, and $\phi_{steer}(n, m)$ refers to the uv steering function.

9. The method according to claim 1, wherein a u spoiling function is defined as:
where $$\phi_U(n) = \frac{2\pi d_u}{\lambda} U_{max} \frac{n(n-N+1)}{N-2}, \; n \in [0, N-1]$$

-continued
$$U_{max} = \sin(\theta_{FOV}) - 2\lambda/\Delta_x N$$

and where
(m,n)—example embodiment of phase spoiling function
$\phi_U(n)$—U-only term of the spoiling function
$\phi_V(m)$—V-only term of the spoiling function (not required if no V spoiling)
$\phi_{steer}(m,n)$—UV steering term of the main beam
m,M—array element row index, M rows
n,N—array element column index, N columns
$\phi(u_0, v_0)$—unspoiled phase function for steering to $u_0, v_0$
$\lambda$—wavelength
$\Delta_x, \phi_y$—row, column element spacing
$U_{max}$—desired U extent of the spoiled beam
$\theta_{fov}$—design-to-Azimuth field of view (FOV)
w(n)—phase weighting function to compensate for scan loss and antenna effects
k—exponent for the above weighting function, a tuning value (typically 0.1-0.25)
$U_{steer}(n)$—column steering angle, a smooth function across the FOV
$V_{steer}(n)$—steering angle for each column to the desired elevation angle (El)
$V_{max}$—desired V extent of the spoiled beam (if V spoiling used)
El—desired elevation angle of the spoiled beam
$El_{ant}$—antenna elevation angle
$T_{ant}$—antenna tilt angle.

10. The method according to claim 9, wherein a v spoiling function is defined as:

$$\phi_V(m) = \frac{\pi \Delta_y}{\lambda} V_{max} \frac{m(m - M + 1)}{M - 2}, m \in [0, M - 1]$$

11. The method according to claim 9, wherein the beam is modified for scan loss using weights w:
where $$\phi_U(n) = \frac{2\pi \Delta_x}{\lambda} U_{max} \frac{n(n - N + 1)}{N - 2} \frac{w(n)}{\min[w(n)]},$$

$$w(n) = \left(1 - U_{steer}^2(n) - V_{steer}^2(n)\right)^k$$

and k is an exponent that provides a tuning value, which is between about 0.1 and 0.25.

12. The method according to claim 1, wherein the u and v spoiled beam comprises a horizontal fan beam having a curvature in uv space that corresponds to the horizon, which is flat in flat in real space and curved in uv space.

13. The method according to claim 1, wherein the beam has a beam pattern weighting for focusing phased array antenna patterns across the entire horizon to enable simultaneous horizon surveillance.

14. The method according to claim 1, wherein the beam has a beam pattern weighting adjustment for scan loss so that the beam has near-constant gain across an FOV.

15. A phased array radar system, comprising:
a beamformer and a beam spoiler module configured to:
generate a beam from a face of the phased array radar system having a curve of constant phase;
a plurality of phase shifters connected to the beamformer; and
a plurality of antennas connected to the plurality of phase shifters, respectively,
wherein the beam is spoiled in u space,
wherein the beam is spoiled in v space, and
wherein the beam has a pattern that is flat in real space and curved in uv space that follows the horizon.

16. The system according to claim 15, wherein the beam comprises a fan beam.

17. The system according to claim 15, wherein the beam has a fixed amplitude is generated by array elements of the phase array radar face having fixed amplitudes.

18. The system according to claim 15, wherein the beam is spoiled in u space based on array element spacing in a column, wavelength, number of elements in columns of the phased array radar face, and field of view of the array.

19. The system according to claim 15, wherein the beam is spoiled in v space based on array row element-to-element spacing, wavelength, and number of row elements.

20. The system according to claim 15, further including controlling the beam in real-time without iterative processing.

21. An article, comprising:
a non-transitory computer-readable medium having stored instructions that cause a phase array radar to generate a beam from a face of the phased array radar having a curve of constant phase,
wherein the beam is spoiled in u space,
wherein the beam is spoiled in v space, and
wherein the beam has a pattern that is flat in real space and curved in uv space that follows the horizon.

* * * * *